United States Patent [19]
Tiraspolsky et al.

[11] 3,782,838
[45] Jan. 1, 1974

[54] SHAFT ASSEMBLY

[75] Inventors: Wladimir Tiraspolsky, Issy-les-Moulineaux; Roger François Rouviere, Aix-en-Provence, both of France

[73] Assignee: Turboservice, S.A., Paris, France

[22] Filed: Oct. 30, 1970

[21] Appl. No.: 85,684

[30] Foreign Application Priority Data
Nov. 28, 1969 France .............................. 6941085

[52] U.S. Cl. ........................... 403/32, 294/83 R
[51] Int. Cl. ............................................ F16b 7/00
[58] Field of Search ................ 287/119 R, DIG. 1; 166/212; 294/83 R, 86.15; 175/107

[56] References Cited
UNITED STATES PATENTS

| | | | |
|---|---|---|---|
| 1,823,340 | 9/1931 | Vance | 294/86.15 |
| 3,245,346 | 4/1966 | Schuetzler | 294/83 R |
| 2,711,313 | 6/1955 | Zumwalt | 267/64 A |
| 1,190,491 | 7/1916 | Watts et al. | 287/119 R |

Primary Examiner—Andrew V. Kundrat
Attorney—Hyer, Eickenroht Thompson & Turner

[57] ABSTRACT

A latch for connecting two axially aligned shafts is movable between a position connecting the shafts to a position where the shafts are disconnected. A piston is positioned in a cylinder so changes in ambient pressure will move the piston and move the latch between the two positions.

4 Claims, 3 Drawing Figures

PATENTED JAN 1 1974
3,782,838
FIG. 1
FIG. 2
FIG. 3
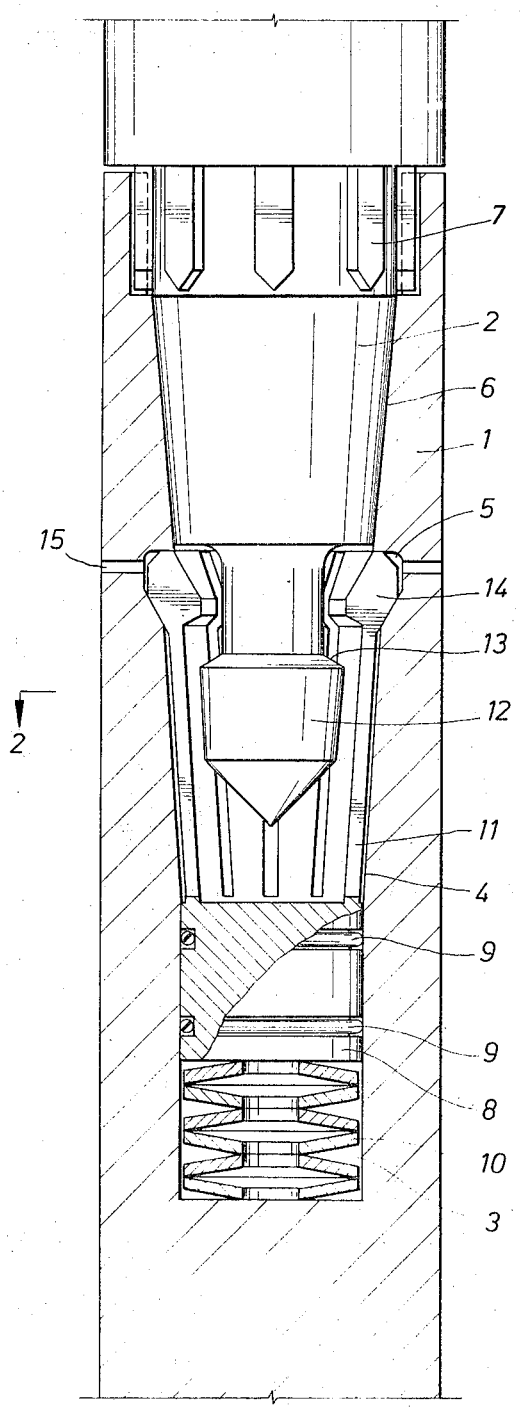
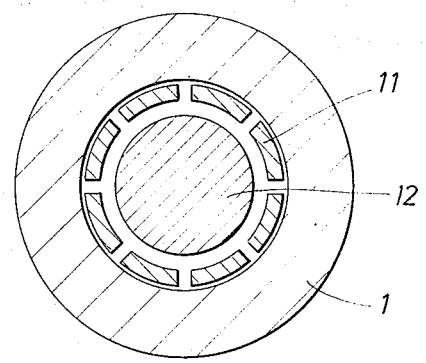
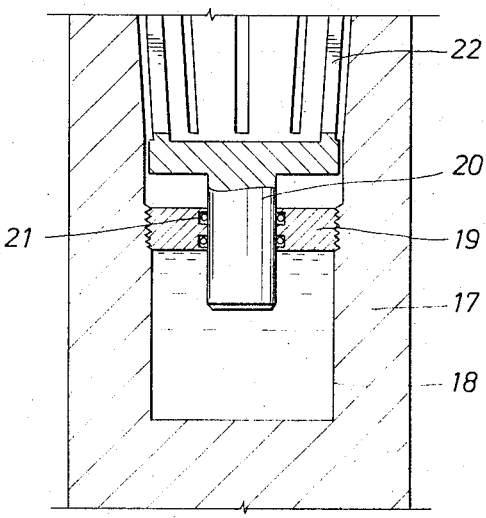
Wladimir Tiraspolsky
Roger F. Rouviere
INVENTORS
BY *Hyer, Eickenroht,*
*& Thompson*
ATTORNEYS

SHAFT ASSEMBLY

The present invention has general reference to coupling devices for aligned shafts or axes.

A problem which is particularly difficult to solve and is often raised in connection with devices introduced into drilled holes, wells or bores and particularly with underground motors used for drilling purposes is the problem of the coupling of shafts or axes surrounded by one or several concentric sleeves which must be in turn coupled, generally by screwing action, while simultaneously the continuity of axial elements has to be ensured. This problem has seemed heretofore so hard to solve that in most cases, particularly for coupling drilling turbines of conventional type, one had to rely on a connection effected between two superimposed shafts by a conical friction abutting device supplemented if necessary by angular keying achieved by flutes, polygonal sections or the like.

The disadvantages of such a system which does not provide a mechanical continuity of coupled shafts, particularly due to the effect of vibratory conditions to which they may be subjected are such that for some type of appliances, one was led to locking the coupling by mechanical means such as tie rods, tensioning devices or the like that were positioned and blocked on completion of the assembling operation as described for example in French Pat. Nos. 1,160,450 and No. 1,559,861.

The field of application of such mechanical solutions is, however, limited because they imply such complications as piercing of at least one of the two coupled shafts and use thereof become a costly and toilsome matter as soon as the lengths of the elements to be coupled exceed a few meters. Moreover, owing to the dimensional restrictions due to the limiting transverse size that devices adapted to be lowered into wells or bores may have, the stresses that can be put to such tensioning devices are limited, and this technique is even practically inapplicable to small diameter appliances, for example to drilling turbines the outer diameter of which is equal to or smaller than 5 inches.

An object of the invention is to remedy such disadvantages and to provide a device for coupling aligned shafts or axes by performing an automatic latching or unlatching action without any need to resort to complicated or expensive mechanical structures.

Another object of the invention is to provide a coupling device for aligned shafts or axes utilizing for ensuring automatic latching or unlatching action between the two shafts or axes such reversible changes of the ambient medium as are undergone by said coupling device between the place or the moment where or when it is assembled and the place or the moment where or when it is utilized and taking advantage of the energetic resources furnished by the change of said ambient medium for generating these forces that are necessary to produce the unlatching action.

While the invention is particularly useful in the domain of drilling or boring the ground, it may also be used for coupling two aligned shafts or axes by latching them together every time a change of the ambient medium, for example a pressure and/or temperature change, takes place between the assembling or mounting position or moment and the utilization position or moment. Such a change is automatically created whenever an appliance under goes a substantially vertical displacement through the atmosphere, the hydrosphere or the earth's crust and it generally appears in such cases in the form of a temperature and/or pressure difference but it may also result from other factors such for example as surface effects or kinetic fields acting as stresses of a similar or different magnitude.

According to the invention, there is provided a coupling device involving an automatic latching action utilizable for interconnecting two aligned shafts or axes and comprising on at least one of said shafts or axes latching means capable of cooperating with associated means provided on the other shaft or axis and characterized by the fact that it includes at least an actuator for said latching means, said actuator being sensitive to the effect of the ambient medium and undergoing, when a change of said ambient medium happens, such a displacement or distortion as will cause a control of said latching means.

According to a particularly simple constructional form, said actuator is constituted by a piston, a pusher or a lever which is shifted when a change takes place in the ambient medium so as to actuate the latching means for automatically latching or unlatching the two aligned shafts or axes. Such an actuator may be for instance permanently subjected on one side to the effect of conditions corresponding with the ambient medium prevailing during the assembling or mounting operation or alternatively to the effect of substantially constant or stable conditions and on the other side to the effect of changes of the ambient medium. Such a result is obtained for example if the actuator is constituted by a piston slidably received in tight fashion in a cylinder defining a closed chamber containing a fluid or urging means such as springs and where the outer face of said piston undergoes the effect of the ambient medium changes so that a displacement of the piston occurs and causes an actuation of the latching means. In such a case, it is the ambient pressure which is operative on the piston for causing such a displacement. But the possibility is also afforded to provide an arrangement taking advantage of the ambient temperature, either separately or jointly with the pressure. Thus a displacement of the actuator may be caused by a volume or length change responsive to a temperature change, for example owing to the juxtaposition of two materials having different thermal expansion coefficients such as steel and the iron-nickel alloy known as "invar" or the like.

The arrangement may be such that the displacement or the distortion of the actuator exerts its action on the latching means in the form of an axial traction, a radial engagement, an inclined motion, an angular locking action or a combination of these effects.

An important advantage of the invention resides in the fact that the automatic latching effect thus obtained is abolished so that the aligned shafts or axes are freed, when the device is brought back to the initial ambient medium for example when a drilling appliance is brought back up to the ground surface.

The following description given with reference to the accompanying non-limitative drawings will permit a better understanding of the invention.

FIG. 1 is a diagrammatic sectional view taken along an axial plane of a device for coupling aligned shafts according to the invention.

FIG. 2 is a transverse sectional view on the line II—II of FIG. 1.

FIG. 3 is a diagrammatic view similar to FIG. 1 showing a constructional modification.

The device represented by FIGS. 1 and 2 is intended to achieve a latching action of the coupling when the device passes over from a medium where a given pressure prevails to a medium where a substantially higher pressure prevails, for instance as is the case when lowering a drilling turbine or tool into a heavy fluid.

This device is intended to couple a lower shaft 1 with an upper shaft 2. As shown, a cylinder 3 is defined in the upper end of the shaft 1 and extends upwardly as a flaring portion 4 providing at its upper end a shoulder 5 merging with a conical seat 6 adapted to receive the lower end of the upper shaft 2 which is formed with flutes 7 engaged in corresponding grooves in the shaft 1.

As shown, a piston 8 is slidably engaged through the cylinder 3, gaskets 9 being interposed so as to isolate the inner chamber of the cylinder 3 from the outer space. Springs 10 housed in the cylinder chamber urge the piston 8 outwardly. The piston carries elastic latching pawls 11 housed in the flaring portion 4 and normally bearing by their end against the shoulder 5 due to the urging action of the springs 10.

In this position, the pawls 11 define between them a sufficient space to enable a head 12 provided at the lower end of the upper shaft 2 to pass therethrough. The head 12 is provided with a rear shoulder 13 against which hook-shaped parts 14 of the pawls 11 may be applied so as to perform the latching action.

Ports such as 15 provide a communication between the recess defined by the flaring portion 4 and the outer space.

The operation of this device is as follows:

For assembling purposes, the shaft 2 is introduced into the upper part of the shaft 1, the head 12 passing between the pawls 11 while the flutes 7 are engaged with the associated grooves. The members then substantially occupy the position visible in FIG. 1 in which the pawl ends are in abutting relation with the shoulder 5.

When the appliance fitted with such a coupling device is lowered for example into a well, the ambient pressure is increased and then exerts itself downwardly while squeesing the springs 10. Such a displacement exerts a tractional stress upon the pawls 11 whose hook-shaped parts are applied against the rear shoulder 13 of the head 12 on the shaft 2, thus automatically achieving the required latching action.

As the appliance is lifted up to the ground surface, the pressure is reduced and the springs 10 push back the piston 8 upwardly thereby moving the pawls 11 off the head 12 on the shaft 2 and unlatching the latter.

Properly sized springs 10 and piston 8 permit the required latching traction to be obtained at the desired depth, such traction being easily limited either by full squeezing of the springs or by a suitable abutment.

Such an arrangement is suitable for example in the case of a drilling turbine equipped with a system of shafts surrounded by tubular elements screwed together such as turbine bodies or unions forming their extensions. Downward and upward motions of the turbine then automatically provide the latching and unlatching action of the coupling device. Where the piston is not automatically returned when being lifted, an axial traction obtained for example by unscrewing an outer housing belonging to the appliance eliminates undue blocking action and easily brings the members back to their unlatching position.

According to the contructional modification visible in FIG. 3, the shaft 17 has a chamber 18 isolated from the outer atmosphere by a cover 19 having an aperture through which a piston 20 is movable, said piston being mounted in fluid tight fashion owing to gaskets 21. This piston carries as in the constructional embodiment shown in FIGS. 1 and 2, latching pawls 22 adapted to cooperate in nonillustrated fashion with a head on the shaft which must be coupled with the shaft 17.

The chamber 18 contains a compressible fluid. As the ambient pressure increases, the piston 20 penetrates into the chamber 18 while exerting an axial traction upon the pawls 22 so as to perform the latching action as hereinbefore described. Upon resumption of the first ambient medium, decompression of the fluid brings the members back to their initial condition.

When dealing with a drilling turbine or tool, a rise in temperature takes place, also an increase of the ambient pressure. The fluid should be so chosen that a final volume change responsive to hydraulic compression and heat expansion should be lower than that of the chamber containing it. Such an arrangement affords the advantage of holding the piston in permanent equilibrium while ensuring its upward return under pushing stresses of the same magnitude as the previously undergone compressive strains.

Minor constructional changes are conceivable without departing from the ambit of the invention in the field of technical equivalencies.

We claim:

1. A shaft assembly comprising first and second shaft means adapted to be coupled together and intended to be subjected to the action of varying or different ambient conditions, a coupling device including a locking head carried by said first shaft means, a recess in said second shaft means so as to define a chamber open at one end only, a piston in said chamber closing the open end thereof and having first and second active faces, said first active face forming one interior end wall of the closed chamber and said second active face being exposed to the exterior of the chamber and to ambient pressure outside the chamber, latching elements located on the side of the piston exposed to the exterior of the closed chamber and carried by the piston for movement by the piston into and out of engagement with the locking head to connect and disconnect the two shafts, means located in the closed chamber for applying a resilient force to said first piston face urging the piston and hooking elements out of engagement with the locking head, whereby a predetermined ambient pressure acting against the second piston face will move the piston into the chamber against the resilient force to move the hooking elements into engagement with the locking head to couple the two shafts together.

2. The shaft assembly of claim 1 in which said latching elements include a plurality of spring arms having hook-shaped parts on their ends and in which a cam means is provided in said recess to move the hook-shaped parts into holding engagement with the locking head when the piston is moved into the chamber a predetermined distance by said ambient pressure.

3. A shaft assembly according to claim 1, wherein the means in the chamber for exerting a resilient force comprise spring means.

4. A shaft assembly according to claim 1 wherein the means in the chamber for exerting a resilient force comprise a compressible fluid.

* * * * *